United States Patent [19]

Bither

[11] Patent Number: 4,646,292
[45] Date of Patent: Feb. 24, 1987

[54] LINK CONTROLLER

[75] Inventor: David S. Bither, Marlborough, Mass.

[73] Assignee: Aetna Telecommunications Laboratories, Westboro, Mass.

[21] Appl. No.: 782,681

[22] Filed: Oct. 1, 1985

[51] Int. Cl.$^4$ .............................................. H04J 3/02
[52] U.S. Cl. ....................................... 370/85; 370/89; 370/83
[58] Field of Search ....................... 370/85, 89, 95, 86, 370/83; 340/825.5, 825.51

[56] References Cited

U.S. PATENT DOCUMENTS

| 3,921,137 | 11/1975 | McClearn et al. | 370/84 |
| 4,379,294 | 4/1983 | Sutherland et al. | 370/85 |
| 4,395,710 | 7/1983 | Einocf et al. | 370/85 |

Primary Examiner—Douglas W. Olms
Attorney, Agent, or Firm—Weingarten, Schurgin, Gagnebin & Hayes

[57] ABSTRACT

A system for controlling access and transmission timing of communication in a repeating sequence over a network between nodes of one or more terminals, such as in a local area network. Each node in the network is equipped to recognize the presence of boundaries in the transmissions of messages by all nodes in the network. Each node is assigned a place in the list of all the nodes on the network and is controlled by a local timing system to be able to transmit over the network only after the node next preceding it in the list has transmitted. This recognition is accomplished by counting the message boundaries on the network and comparing the count against the list of nodes in the network. Each node will transmit during its time a message of variable length, up to a maximum, but never less than a minimum that identifies its presence in the network. The system has the capability to recognize a missing node and a jammed network by timing the intervals between messages and comparing these against the maximum allowable transmission times. The system utilizes a very small minimum transmission time so that great efficiency is achieved. The intervals between node transmission times is set to be just larger than the maximum predictable network delays. This achieves predictability in network operation that allows each node to use internally generated timing to identify the cyclical network operation, while achieving high efficiency in network operation and accommodating real time transmission needs.

13 Claims, 3 Drawing Figures

LINK CONTROLLER

FIELD AND BACKGROUND OF THE INVENTION

The present invention relates to the control of transmissions over a network by many stations or nodes all sharing that same network transmission path. Typical of such systems is the case where many nodes are coupled into the same optical fiber network and are capable of receiving the transmissions of all the nodes in the network.

Various systems have evolved to permit the nodes on such a network to transmit and receive in a manner that does not cause a collision between nodes, i.e., prevents two or more nodes from trying to transmit over the network at the same time.

One such scheme is known as time slotting. In this system, each node in the network is assigned a slot of time in a repeating sequence of plural slots, each typically of the same, unvarying size. This system is very inefficient in the use of network time because the time in each slot is committed to the corresponding station whether or not that station has any information to send. Only where all nodes on the network are always busy is there efficient use of the network capacity in such a system. The entry of or deletion of nodes from the network also requires complete rearrangement of the timing system, or the inclusion of extra time slots which waste network time.

A second type of time sequencing for enabling all nodes on a network to have an opportunity to use the network communication capability is token passing. In this case, a node grabs the network and keeps it until it is finished with the traffic it wishes to send. That node then sends a token or special indicia over the network which informs the next to send node of the opportunity for it to transmit. This system is not ideal for real time network usage, such as in live voice communication or real time control in robotics, because it does not insure each node a chance to transmit often enough to maintain the requisite data exchange rate.

A third system accommodating plural nodes trying to use the same network involves collision avoidance. Here a node desiring to send begins to transmit and continues unless it detects the presence of another node trying to send simultaneously. If this interfering situation is detected, both nodes cease sending and wait a different, randomly set interval before trying to send again. This approach is only efficient where there is little traffic from any of the nodes in the network. If communication is continuously underway, the time delays needed to resolve the collisions of nodes trying to send simultaneously is excessively wasteful.

A fourth approach to the simultaneous use of a single network by several nodes is the use of a master-slave hierarchy between nodes in which one node acts as controller for all the other nodes. Only in rare cases where the nodes are not fully independent is this system effective.

Finally, the grant-request approach of copending, commonly assigned application Ser. No. 534,562, filed Sept. 22, 1983, is an example of a further system utilizing a prioritization of requests for network use by all stations utilizing the same priority algorithm. Each station makes the same priority decision so that the node to send next is known to each node, including the node to send.

BRIEF SUMMARY OF THE INVENTION

In accordance with the teaching of the present invention, there is shown a system by which a plurality of nodes communicates in a network in a manner efficiently accommodating nodes of varying transmission needs and additionally providing real time transmission access to the network to accommodate voice communication, factory automation, video, etc. Each node in the network is placed in a repeating sequence of times for it to transmit, each time unique to each node. A short, but predictable minimum time period is established between messages sent over the network by different nodes, and during a message interval the appropriate node will transmit a minimum message. This enables all nodes to count the passage of assigned times for each node in the network. Each node identifies in this manner when each node, including itself, will have the opportunity to transmit. A maximum amount of time is allotted to each node for its message transmission which prevents network hogging by any one or more nodes, while there is a very small minimum message size which in turn insures that the network will not be significantly occupied by nodes that have no traffic to send.

Each node additionally times the network utilization by all other nodes and detects any deviation from the normal timing of message flow as a network jam, the disappearance or reappearance of a node, and instructs the local controller of the node to act accordingly.

BRIEF DESCRIPTION OF THE DRAWING

These and other features of the invention are more fully described below in the solely exemplary and not limiting detailed description of the invention and accompanying drawing of which.

DETAILED DESCRIPTION

The present invention contemplates a link control system for networking a plurality of nodes in which the access to the common network message path is controlled by having each node recognize its time for transmission in a repeating sequence of variable length, minimally but predictably separated, times. Each node identifies the presence of each message, and from locally generated timing of the allotted times for messages, and the intervals between them, recognizes its time to transmit.

Figure 1:
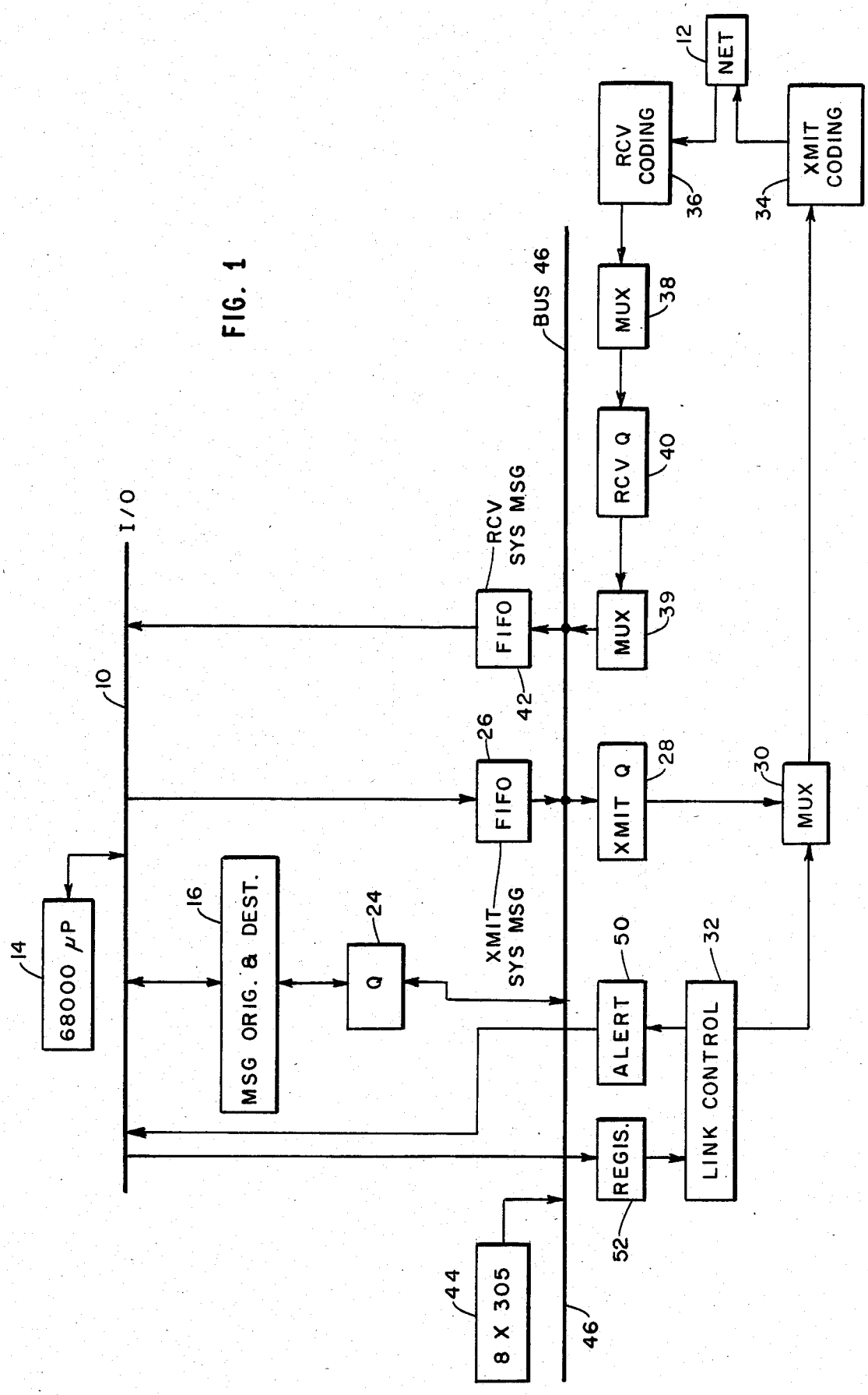
FIG. 1 is a block diagram of system elements of a network node according to the invention.

The system of the present invention typically operates within the framework of a node of the type described in copending commonly asigned U.S. patent application Ser. No. 534,562, filed Sept. 22, 1983, which is incorporated herein by reference. A node of the present invention thus is typically resident within a local area network, such a node being of the type illustrated in FIG. 1. As shown there, a network 12, such as a fiber optic link, has associated with it a plurality of nodes of the type shown in FIG. 1. Each node preferably includes a three-level processor hierarchy in which the upper or hierarchically highest level includes a powerful microprocessor 14 such as a type 68000 of the Motorola Company and associated I/O bus 10. The highest level processor 14 possesses most of the system intelligence and provides the node control and message routing function from information stored in its associated memory or received as system messages from remote nodes over the network 12 or further provided to it as alert messages from the link controller of the present invention, associated with the third level processor as more fully described below.

The hierarchically highest processor 14 communicates directly through FIFO queues 26 and 42 with the third level and the network. Additionally, actual messages, voice or control, are assembled or received in a middle level of processing at a message orgination and destination system 16. System 16 typically assembles message packets or blocks from or to user terminals including any associated routing indicia from the processor 14. System 16 communicates hierarchically downward in the node through a queue 24 to the third or lowest processor level of the node and thence to the network.

The lowest processor level includes a transmit path for the queue 24 or queue 26 through a queue 28 and a multiplexer 30 under control of a link controller 32. The multiplexer 30 sends through a transmit coder 34 to the network 12. The low level processor also includes a receiver and decoder 36 that responds to all signals on the network 12 and directs them through a multiplexer 38, a receive queue 40, and through a further multiplexer 39.

The third level includes a processor 44 acting over a bus system 46 to control the timing of the flow of information through the queues 28 and 40 on the one hand and the queue 24 (and queues 26 and 42) on the other hand. The bus 46 connects to several other second level systems within the same node.

The link controller has associated with it an alert register 50 which provides to the I/O bus 10 the indication of a network alert status as described below for the top level processor to be informed and act accordingly. Also included is a set of registers 52 which operates through the bus 10 to identify the nodes in the network and the position of the present node in the network as established at the start of communication by the hierachically highest processor.

Figure 2:
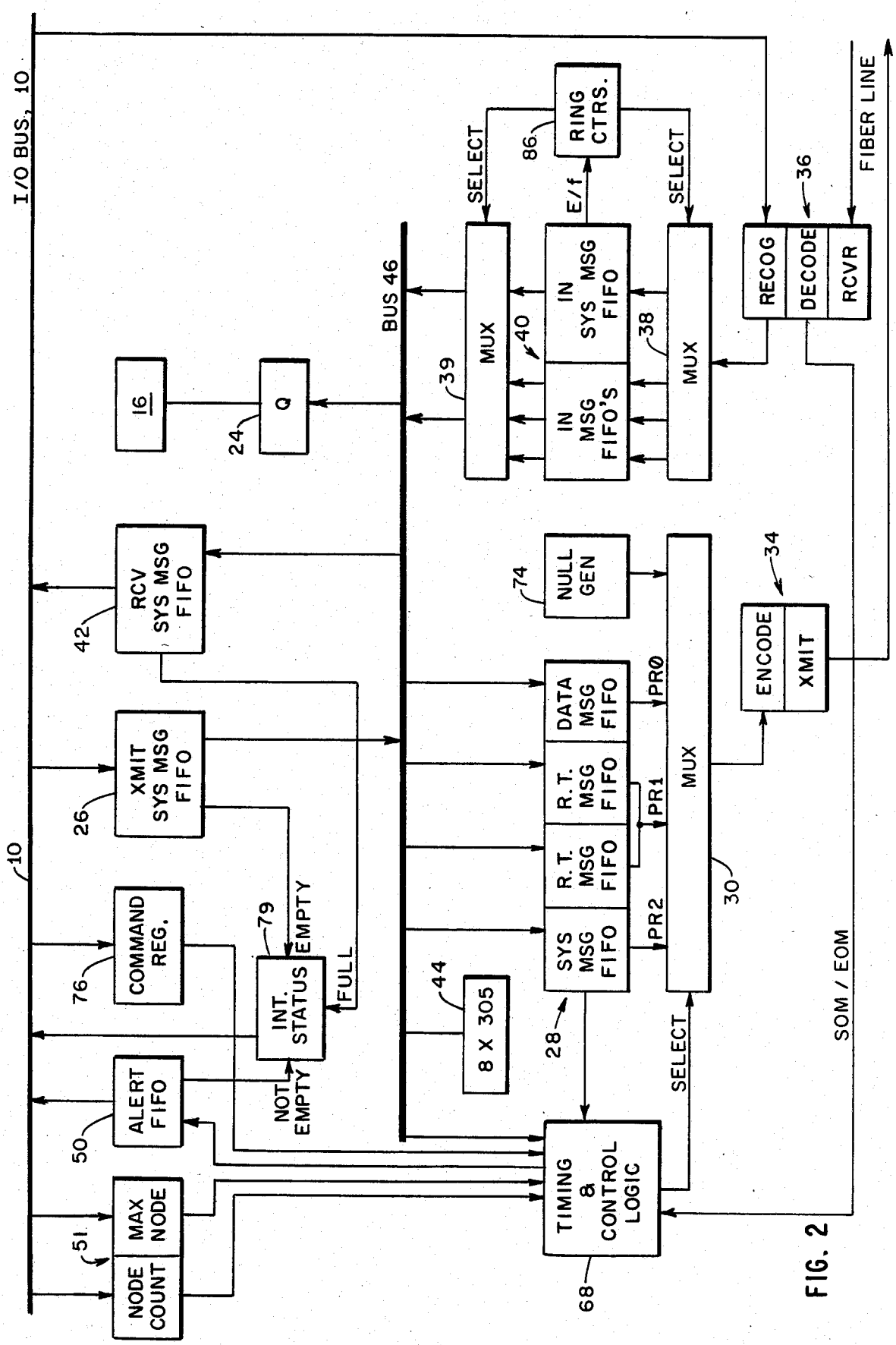
FIG. 2 is a detailed element diagram of the link control, and transmit and receive portions of the node of FIG. 1.
Figure 3:
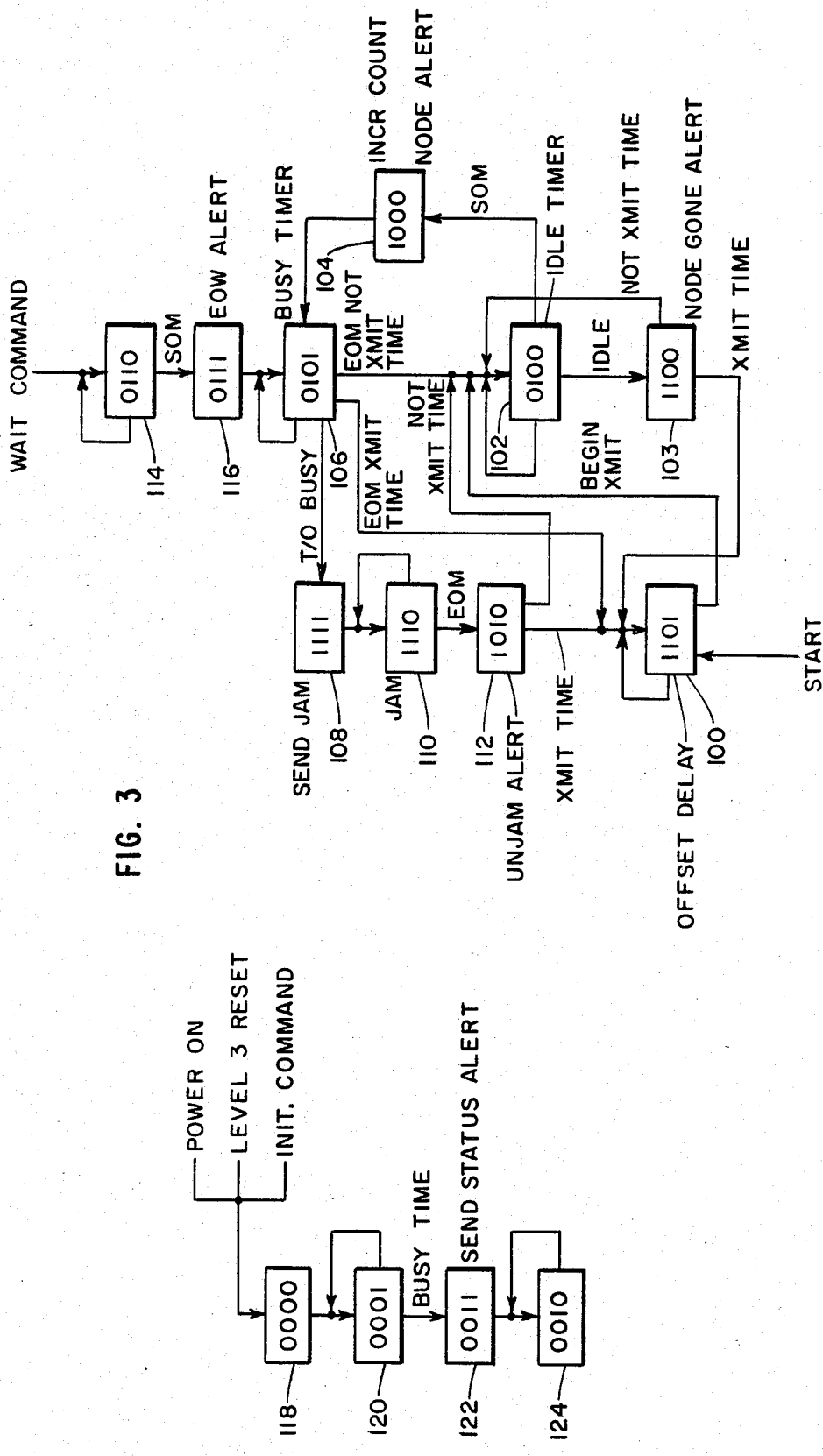
FIG. 3 is a state diagram of the operation of the link control of the present invention.

The system of the present invention is more fully described in the detailed element diagram of FIG. 2. The transmit path includes digital voice or data message queue 24, and system message FIFO queue 26, the latter providing a priority path for system data from the top level of the node. The queues 24 and 26 communicate with the third level under the control of the third level processor 44 for application of signals from queue 24 or queue 26 to the transmit queue 28. Queue 28 comprises separate queues for data, voice or other real time, and system messages, in priority order. The priority is directed by the multiplexer 30 from a timing and control logic system 68, the operation of which is indicated in FIG. 3, described below. The transmit encoder typically converts the digital signals to a form such as Manchester coding, appropriate for transmission over the network. The status of queue 28 is indicated to the controller 44 via bus 46 so that the processor is alerted to prevent overwriting of messages in the queue 28. A null generator 74 is provided to enable the multiplexer 30 to transmit a brief null message when the transmission time of the node comes up if the queue 28 is indicated to be empty. The null messages indicate the node's place in the network and keep other nodes from generating an indication of a missing node on the network but occupies a minimal amount of network time. Logic 68 defines the maximum message size.

A command register 76 receives commands from the bus 10, typically generated by the upper level processor 14 to accomplish various link functions as described below and communicates these to the link control logic 68. An interrupt status register 79 monitors the contents of the transmit system message queue 26, the alert register 50 and a receive system message queue 42 to provide indicia over the bus 10 of the empty, not empty, and full status of those registers respectively to the hierarchically superior processor. A network register 51, part of register 52, includes indicia of the number of nodes in the network and the position or node count of the local node.

The receive side includes the receive decoding system 36 providing data to the multiplexer 38. Node identification is accomplished by an address recognizer in the decoder 36 to recognize data that is addressed to the local node and whether it is a system message or not and thus pass it on to the multiplexer 38. Indications of start of messages and end of messages are applied to logic 68 for all messages on the network for all nodes. The multiplexer 38 fills a set of registers of the queue 40 depending upon whether the incoming data is a system message or otherwise (data, voice or real time). The registers of queue 40 pass their contents through multiplexer 39 to the bus 46. Ring counters 86 coordinate both multiplexers 38 and 39 through queue 40.

The operation of the timing and control logic 68 in providing link transmit and communication control within the context of the system of FIG. 2 is shown in FIG. 3 taken in conjunction with the state table, Table I. As shown in FIG. 3, fourteen states govern the operation of the system in controlling the link access and in detecting link status. Each state is identified by a four-digit binary code for correlation with the state table. In each state one or more registers within the controller 68, and identified in Table I, are either checked or set according to the state table.

From a "start" condition, a state 100 is entered which initiates a delay, used to separate messages on the network a predictable small interval. The start of a message is set up by the upper level processor to coincide with the time for the node to transmit as determined by external means when a node joins the network. At the end of the delay time, the system transits to a state 102 during which the local node initiates a transmission from the queue 28 or generator 74. Busy and offset timer registers of controller 68 are also preset with the appropriate time intervals identified below. The state 102 also initiates an idle time interval, which exceeds a predictable maximum time between messages from sequentially adjacent nodes. This is selected to be slightly greater than the maximum network propagation delay in conjunction with the offset delay of state 100. If this time passes before a message, including a message from itself, is detected on the network via receiver 36, processing goes to a state 103 in which a node absent alert is generated. At this point, a node history register is reset denoting the loss of a node; the idle, busy, and offset timer registers are preset; and the node counter is incremented and SOM (start-of-message detection) and EOM (end-of-message detection) registers cleared. From state 103 processing returns to state 100 if it is the node's transmit time, otherwise to state 102. If the requisite time in state 102 does not pass before the beginning of a message is received at the receiver 36, the logic system transits to the state 104. At this point, the node counter in the registers 52 is incremented one node and the alert FIFO is provided with an indication of the existence of the node on the network if that node was previously missing. Also the idle, busy, and offset timer registers are preset; the node history register set; and the start-of-message (SOM) register cleared. State 104 always transits to state 106 which waits an interval identified by the busy timer register for the appearance of an end-of-message (EOM) indication, the end of signal on the network. That time just exceeds the predictable maximum message duration.

From state 106 several avenues are possible. If the EOM signal is detected, and the node count register indicates that the local node is not to transmit, then the system transits to state 102 and the cycle repeats. If it is time for the local node to transmit, then the system transits to state 100 and that cycle begins again. If the busy time in state 106 passes before an EOM, then the system transits to a state 108. In state 106 the idle and offset timers are preset and the SOM register cleared as well.

In the state 108, a link jam alert is sent to the alert FIFO 50; the busy, idle and offset timers are preset; and the SOM register is reset. From state 108 the system always transits to a state 110 where the system stays until an EOM signal is received, transiting then to a state 112 where an unjam alert is provided through the alert FIFO 50. In state 110 the same registers and timers are affected as in state 108, while in state 112 the same timers are preset but the EOM register is cleared instead of the SOM register. The system then transits to the state 100 if it is the local node's transmit time, or the state 102 otherwise.

If instead of a start command the upper level processor sent a wait command through the register 76, the system would enter a state 114 in which the system stays until a start-of-message indicia is received. In the state 114, the wait register which was set by the upper level processor to initiate the state 114 is reset, and the EOM register is cleared in anticipation of receiving an EOM signal in state 106 later. From state 114, the system transits to a state 116 which sends an end-of-wait alert through the alert FIFO 50; presets the idle, busy and offset timers; increments the node counter; and sets the node history register while clearing the SOM register. From state 116 the system transits to state 106 for operation as before.

The link access system is initialized in response to a power turn-on condition, a reset of the third level processor, or by the generation of an initialization command. Any one of these causes the system to enter a state 118 which clears the initialization, wait, start, SOM and EOM registers and resets the node history register and presets the idle, busy and offset timer registers. From state 118 the system always transits to a state 120 which waits for a preset busy time to pass while the system examines the status registers. At the end of the busy time the system transits to a state 122. In the state 122, the system sends the network busy or idle status according to whether or not any SOM or EOM was detected through the alert FIFO 50 and presets the timers for busy, idle, and offset, finally transiting to a state 124 where a system message is sent whenever that buffer is full. The state 124 is terminated by a wait or start command to shift processing to states 114 or 100.

The above-described system assigns communication times to nodes on a network in a manner that insures an efficient utilization of the network time. Predictable maximum and very short minimum transmission times allow real time communication while minimizing the time occupied by nodes without traffic. Predictable times between messages allow each node to identify its transmission time, as well as the transmission times of all other nodes.

TABLE I

| STATE | Set Node Histories | Clear Init. | Clear Wait | Clear Start | Preset Idle | Preset Busy | Preset Offset | Incr Node-Ctr | Clr Node History | Set Node History | Pulse Xmit-SOM | Send Alert | Clear SOM | Clear EOM |
|---|---|---|---|---|---|---|---|---|---|---|---|---|---|---|
| 0000 | 1 | 1 | 1 | 1 | 1 | 1 | 1 | 0 | 0 | 0 | 0 | 0 | 1 | 1 |
| 0001 | 0 | 0 | 0 | 0 | 1 | 0 | 1 | 0 | 0 | 0 | 0 | 0 | 0 | 0 |
| 0011 | 0 | 0 | 0 | 0 | 1 | 1 | 1 | 0 | 0 | 0 | 0 | Status | 0 | 0 |
| 0010 | 0 | 0 | 0 | 0 | 1 | 1 | 1 | 0 | 0 | 0 | Sys Full | 0 | 1 | |
| 0110 | 0 | 0 | 1 | 0 | 1 | 1 | 1 | 0 | 0 | 0 | 0 | 0 | 0 | 1 |
| 0111 | 0 | 0 | 0 | 0 | 1 | 1 | 1 | 1 | 0 | 1 | 0 | EOW | 1 | 0 |
| 0101 | 0 | 0 | 0 | 0 | 1 | 0 | 1 | 0 | 0 | 0 | 0 | 0 | 1 | 0 |
| 1111 | 0 | 0 | 0 | 0 | 1 | 1 | 1 | 0 | 0 | 0 | 0 | Jam | 1 | 0 |
| 1110 | 0 | 0 | 0 | 0 | 1 | 1 | 1 | 0 | 0 | 0 | 0 | 0 | 1 | 0 |
| 1010 | 0 | 0 | 0 | 0 | 1 | 1 | 1 | 0 | 0 | 0 | 0 | Unjam | 0 | 1 |
| 0100 | 0 | 0 | 0 | 0 | 0 | 1 | 1 | 0 | 0 | 0 | 0 | 0 | 0 | 1 |
| 1100 | 0 | 0 | 0 | 0 | 1 | 1 | 1 | 1 | 1 | 0 | 0 | Node Gone | 1 | 1 |
| 1101 | 0 | 0 | 0 | 1 | 0 | 1 | 0 | 0 | 0 | 0 | Offset | 0 | 0 | 1 |
| 1000 | 0 | 0 | 0 | 0 | 1 | 1 | 1 | 1 | 0 | 1 | 0 | Node Here | 1 | 0 |

The above-described embodiment is exemplary only of the invention the scope of which is as indicated in the following claims:

What is claimed is:

1. A system for controlling message transmission timing on a network by a plurality of nodes comprising:
   means associated with each node for sending a message having beginning and ending portions over said network;
   means associated with each node for providing said message signals with a variable time duration ranging between a preset maximum and a nonzero minimum;
   means associated with each node for receiving all messages on said network;

means associated with each node for counting messages on the network from received messages to provide a repeating sequence of count values;

means associated with each node for enabling the sending of messages by that node at a count value unique to that node; and means associated with each node for delaying the enablement of message sending a predetermined delay after receiving the ending portion of the message occurring in count value next preceding the count value unique to that node.

2. The control system of claim 1 further including means associated with each node for causing it to send a null message in lieu of other message traffic.

3. The system of claim 1 wherein means for delaying the enablement of sending of a message delays the message slightly more than a transmission delay associated with said network to insure that each node will receive messages from the various nodes with a predictable maximum time separation.

4. The system of claim 1 further including means for detecting the absence of a normal sequence of messages associated with each count value.

5. The system of claim 4 further including means for providing an indication of an absent node in response to detection of said absence of a normal sequence.

6. The system of claim 5 wherein said detecting means is operative to detect the absence of a message beginning portion.

7. The system of claim 4 further including means for providing an indication of a network malfunction in response to detection of the absence of said normal sequence.

8. The system of claim 7 wherein said detecting means is operative to detect the absence of a message ending portion.

9. The system of claim 8 wherein said means for detecting the absence of a message ending portion is operative to provide said detection in response to the failure to receive an ending portion within a predetermined time period after the reception of a beginning portion.

10. The system of claim 9 wherein said detecting means is operative to detect the reception of an ending portion after providing said malfunction indication and to commence operation of one of said delaying means and said sending means as a function of the count value.

11. The system of claim 2 wherein means are provided to separately assemble and prioritize real time and data message traffic at each node.

12. The system of claim 1 further including means associated with each node for incrementing the counting of messages upon detection of a starting portion of a message.

13. The system of claim 5 further including means associated with each node for incrementing the count of messages in response to said indication of an absent node.

* * * * *